Nov. 20, 1951
R. O. McINTOSH
2,575,724
METHOD OF TREATING KOVAR
Filed March 9, 1949
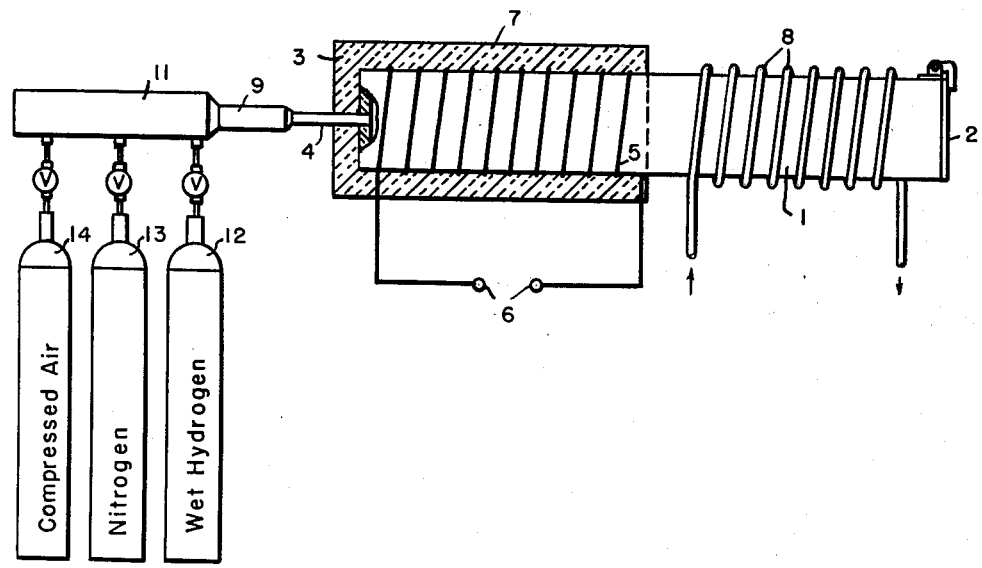
WITNESSES:
INVENTOR
Ralph O. McIntosh.
BY
ATTORNEY Patented Nov. 20, 1951

2,575,724

UNITED STATES PATENT OFFICE 2,575,724

METHOD OF TREATING KOVAR

Ralph O. McIntosh, Pittsburgh, Pa., assignor to Westinghouse Electric Corporation, East Pittsburgh, Pa., a corporation of Pennsylvania Application March 9, 1949, Serial No. 80,378

2 Claims. (Cl. 148—6.35)

My invention relates to a method in which objects are heated to high temperatures in furnace atmospheres in which the surfaces of metallic members are coated at high temperatures with chemical compounds resulting from combination with the metal of substances in the furnace atmospheres. As a very specific example, it is desired to prepare metallic members consisting of the alloy Kovar described in the United States Patent 2,062,335 to H. Scott, assigned to the assignee of the present application, by first subjecting the metallic surface to contact with wet hydrogen while at a temperature of 900° C. to 1100° C.; and in some cases thereafter exposing the metallic surface to an oxidizing temperature at a temperature around 1000° C.

The prior art procedure for carrying out the above-mentioned treatment comprised first placing the metallic member in the furnace with the moist hydrogen atmosphere while the furnace was at a relatively low temperature; then raising the furnace temperature up to the above-mentioned treating temperature; then cooling the furnace and its content to a relatively low temperature and removing the metal from the furnace. The metal member then was introduced into another furnace at a relatively low temperature, heated up to the desired oxidizing temperature in an oxidizing atmosphere and then cooled down to room temperature in the same atmosphere; after which the metallic member was removed from the furnace.

I have found considerable difficulties to arise in carrying out this prior art procedure in that the metallic parts are frequently irregular in shape and thickness, as a result of which portions of the metal become heated to a reacting temperature considerably ahead of other portions during the rising temperature part of the heating cycle; and drop to lower temperatures more quickly during the cooling steps of the heating cycle. As a result, the oxidation or other reaction varies from point to point over the surface of the metallic member. Another difficulty arises in that the time of heating and cooling must be determined carefully for each shape and size of the metallic member; and that this time will vary between one furnace and another having a different size and structure. Still another objection is that the metallic part is exposed to two successive heating and cooling cycles which in many cases creates difficulty from warping from the metallic part.

One object of my invention is accordingly to provide a technique for subjecting metallic members to such reaction temperatures as have been described above which shall be free from the difficulties due to uneven chemical reaction at various points on the surface of the metal member.

Another object of my invention is to provide a procedure for heat treating metal members to effect the chemical reactions described above which shall produce results which are substantially independently of the configuration, heat capacity, and heat conductivity of metallic members of various types.

Another object of my invention is to provide a procedure for carrying out chemical reactions of the above-described type at elevated temperatures without subjecting the metallic member to more than one heating cycle.

Still another object of my invention is to provide an improved procedure for subjecting objects to chemical reaction with various environing atmospheres at elevated temperatures.

A further object of my invention is to provide an improved procedure for heat treating Kovar metal parts in wet hydrogen atmospheres or in oxidizing atmospheres to prepare them for vacuum-tight sealing to glass.

Other objects of my invention will become apparent from the following description taken in connection with the drawing in which the single figure is a diagrammatic illustration of a furnace and ancillary apparatus for carrying out the procedure comprising my invention.

Referring in detail to the drawing I provide, for heating metallic objects such as rings, tubes and other configurations of Kovar to high temperature and subjecting them then to reaction with moist hydrogen or oxidizing atmospheres, a furnace which may conveniently comprise a cylindrical container 1 comprising quartz, porcelain, zircon stainless steel, or other refractory material walls and having at one end a displaceable door 2, its other end being enclosed by a wall 3 permitting the entrance of a tube 4 through which any desired gaseous atmosphere may be introduced. The door 2 may in general be of sufficiently loose fit so that gas from the interior of the furnace can continually leak out around its edges, although, alternatively, a tightly fitting door may be used providing another type of vent is provided for the furnace. The portion of the furnace walls 1 comprising about 50% of its length adjacent the inlet tube 4 may be wound with any suitable electrical resistor 5 through which current passing from a power circuit 6 can be caused to heat the furnace to high temperatures as desired. The resistor 5 is preferably enclosed within a surrounding wall 7 of heat insulating material, the end 3 of the furnace being preferably likewise coated with such heat insulation.

The remaining portion of the furnace walls 1 adjacent the door 2 may be provided with means for cooling it such as a coil 8 of pipe through which cooling water is kept continually flowing.

The tube 4 is connected through any appropriate duct 9 to a manifold 11 which is in turn provided with a number of branch ducts 12, 13, 14 provided with valves and arranged to be connected to any desired reservoirs of gas or vapor. For example, the branch 12 may be connected to a source of wet hydrogen which it may be desired to use to treat objects within the furnace; the branch 13 may be connected to a reservoir of nitrogen or other relatively inert gas and the branch 14 may be connected to a reservoir of compressed air.

In carrying out the heat treatment of a Kovar member first in an atmosphere of wet hydrogen and later in an oxidizing atmosphere, the furnace is heated up so that the portion of it surrounded by the heater wire 5 is raised to a temperature of the order of 900° to 1100° C. This heating may, if desired, be carried out with an atmosphere of air inside the furnace or alternatively may be carried out with an atmosphere of nitrogen or hydrogen introduced from the reservoir connected to the branch 13. The pressure of the reservoirs connected to the branches 12, 13 and 14 should, of course, be higher than atmospheric, as a result of which gas will flow from such reservoirs through the input tube 4 and displace the atmosphere previously present inside the furnace through the gaps at the edge of the door 2. In one way of carrying out the wet hydrogen treatment above-mentioned, the furnace should be first heated to the desired operating temperature of 900° C. to 1100° C. in the zone surrounded by the heater wire 5 and filled with an atmosphere of nitrogen or in many cases the furnace can be heated while filled with the wet hydrogen atmosphere. The valve in branch 13 or 12 then remaining open so that nitrogen or hydrogen flow will prevent any substantial influx of air, the door 2 may be opened for a sufficient time to introduce the Kovar or other metallic part desired to be heat treated into the zone of the furnace which is surrounded by the heater wire 5. The metallic part will then rise in temperature until all portions of it are uniformly heated to substantially the temperature of the furnace walls within the above-mentioned zone. If nitrogen had been flowing, the valve in branch 13 may then be closed and the valve in branch 12 opened. Wet hydrogen then flows into the furnace displacing any nitrogen there present through the vents in the neighborhood of the door 2. The metallic members will then be in the condition of undergoing treatment at the above-mentioned high temperature with a wet hydrogen atmosphere and for many purposes with which I am acquainted they may be permitted to undergo this treatment for periods of from 10 minutes to 8 hours. At the end of the desired period, the valve in branch 12 may be closed to shut off the supply of wet hydrogen and the valve in branch 13 opened to displace the hydrogen atmosphere from the furnace through the vents 2 and leave the metallic members immersed in a nitrogen atmosphere. There is substantially no undesirable chemical reaction between Kovar and the nitrogen atmosphere at such temperatures; and the same thing is true of most common metals such as iron or steel.

If it is then desired to oxidize the metal members the valve in branch 13 may be closed to shut off the nitrogen supply and the valve in branch 14 immediately opened to displace the nitrogen atmosphere from the furnace and to surround the metallic members with an oxidizing atmosphere. Oxidation will then proceed. For many purposes with which I am acquainted, it is sufficient, in the case of Kovar metal members, that this oxidation should continue for from 1 to 2 minutes at a temperature of 1000° C. The temperature of the furnace may, if desired, be reduced to the latter figure before the compressed air is permitted to displace the nitrogen. Upon termination of the oxidizing treatment the valve in branch 14 may be closed and the valve in branch 13 opened to permit nitrogen to displace the air from the interior of the furnace 1. The oxidation process will then be stopped promptly.

The supply of current to the winding 5 may then be cut off and the furnace be allowed to drop in temperature to the point where the metallic members will undergo no objectionable further oxidation upon contact with the external air. Thereupon the metallic members may be removed from the furnace through the door 2 and the reheating of the furnace by the winding 5 in an atmosphere of nitrogen to the desired operating temperature for wet hydrogen treatment may take place again as has been described at the outset of the description of the process above.

However, for many purposes the end of the furnace 1 which is adjacent the door 2 may be kept at sufficiently low temperature by action of the cooling coil 8 so that the metallic members will fall to a non-oxidizing temperature even while the zone of the furnace in the neighborhood of winding 5 is still retained at its high temperature by continuous flow of current in it from the source 6. Under such circumstances, the door 2 may be opened and the metallic objects removed from the end of furnace 1 which is cooled by coil 8 without ever reducing the temperature of the zone of the furnace within winding 5.

It will be evident from a consideration of the foregoing that the metallic parts undergoing treatment are never undergoing a substantial temperature change at any time that they are in contact with either the hydrogen or the oxygen atmospheres which cause chemical reaction at their surfaces; thus, they have full opportunity to acquire temperature equilibrium before contacting either one of these gases. In this way any tendency to inequality of reaction at various parts of the metal members is insured against. It will be also evident that no exact determination of the time which the metal members spend in the heated zone of the furnace is necessary since chemical reaction always takes place at a uniform and definite temperature in all their parts regardless of their size. They never overheat in any part if they stay within the high temperature furnace zone too long. It will also be evident that the metallic member has in the above-described process been subjected to chemical reaction with different gases with only a single heating and cooling cycle, thereby minimizing any warping due to such temperature cycle.

While I have described the principles of my invention as particularly useful in subjecting the alloy Kovar to treatment with moist hydrogen and to oxidation, it will be evident that the principles of raising the metallic member to its reaction temperature while immersed in an inert atmosphere, and controlling the amount of chemical reaction by the length of time that a reacting gas is permitted to remain in contact with the metal in a furnace, are applicable to other reacting gases and to other materials than the alloy Kovar.

I claim as my invention:

1. The method of subjecting a Kovar member to successive treatments by hydrogen and oxygen at high temperatures which comprises heating the Kovar from room temperature to the desired reacting temperature while surrounded by an atmosphere to which said Kovar is chemically inert, thereupon displacing the chemically inert atmosphere with an atmosphere which produces a reducing reaction on Kovar and continuing the presence of the reducing atmosphere only for the time during which reaction is desired to take place; then displacing the reducing atmosphere with a chemically inert atmosphere about the object, then rapidly displacing the chemically inert atmosphere about the object by an atmosphere which has an oxidizing effect on Kovar and continuing the presence of the oxidizing atmosphere for the period during which it is desired to continue oxidation; then rapidly displacing the oxidizing atmosphere with an atmosphere which is chemically inert to Kovar and thereafter cooling the Kovar while surrounded by said inert atmosphere to a temperature at which it will not oxidize in air before removing it from the furnace.

2. The method of preparing a Kovar member for sealing to glass which comprises first heating said Kovar member at a temperature of the order of 900° C. to 1100° C. in an atmosphere of wet hydrogen for a predetermined time, then displacing said wet hydrogen atmosphere about the Kovar with an atmosphere which is chemically inert to Kovar, then rapidly displacing said chemically inert atmosphere by an atmosphere which produces an oxidizing action on Kovar and exposing said Kovar to said oxidizing atmosphere for a predetermined time, thereafter rapidly displacing said oxidizing atmosphere about said Kovar with an atmosphere which is chemically inert to Kovar and thereafter reducing the temperature of said Kovar while still surrounded by said inert atmosphere to a value at which it is inert to ordinary air.

RALPH O. McINTOSH.

REFERENCES CITED

The following references are of record in the file of this patent:

UNITED STATES PATENTS

| Number | Name | Date |
| --- | --- | --- |
| 2,068,785 | Bain et al. | Jan. 26, 1937 |
| 2,121,804 | Larson | June 28, 1938 |
| 2,402,084 | Rennie | June 11, 1946 |